TAPE DRIVE WITH MEANS TO INTERMITTENTLY
CONNECT VACUUM TO TWO LOOP BOXES
Original Filed July 28, 1964

INVENTOR
ANDREW GABOR

United States Patent Office 3,518,649
Patented June 30, 1970

3,518,649

TAPE DRIVE WITH MEANS TO INTERMITTENTLY CONNECT VACUUM TO TWO LOOP BOXES

Andrew Gabor, Bedford, Mass., assignor to Potter Instrument Company, Inc., Plainview, N.Y., a corporation of New York Original application July 28, 1964, Ser. No. 385,727, now Patent No. 3,378,826, dated Apr. 16, 1968. Divided and this application Mar. 8, 1968, Ser. No. 711,660
Int. Cl. B65h *17/28, 17/42*
U.S. Cl. 340—174.1 3 Claims

ABSTRACT OF THE DISCLOSURE

The specification and drawings disclose a pair of vacuum pockets on either side of a continuously rotating capstan. These pockets respectively draw a tape loop into engagement with the capstan and pull the loop out of engagement with the capstan.

BACKGROUND OF THE INVENTION

This invention generally relates to information storage devices and, more particularly, to a magnetic tape random access information memory. This application is a division of application, Ser. No. 385,727, filed July 28, 1964, now U.S. Pat. No. 3,378,826.

Random access memories are used in digital computers and other data processing equipment to store information to used or operated upon by data processing equipment and to provide such stored information to the data processing equipment quickly from any selected random location or "address" in the memory. The random access memories prior to the present invention, for given capacities of stored information, require too much time to find a selected address at random and to read the information out from the selected address, or other mechanical limitations have made them impractical.

One object of this invention is to provide an improved system for selecting one of a plurality of magnetic tapes for transducer operations.

SUMMARY OF THE INVENTION

Briefly, this invention contemplates the provision of a pair of pockets on either side of a continuously rotating capstan. The pocket on one side is contiguous with the capstan and draws the tape into engagement with the capstan. The pocket on the other side is separated from the capstan and draws the tape simultaneously away from the capstan and away from a transducer head. Advantageously, a solenoid operated valve couples one or the other of the pockets to a common source of vacuum.

BRIEF DESCRIPTION OF THE DRAWINGS

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views.

DESCRIPTION OF THE PREFERRED EMBODIMENTS

Figures 1, 2:
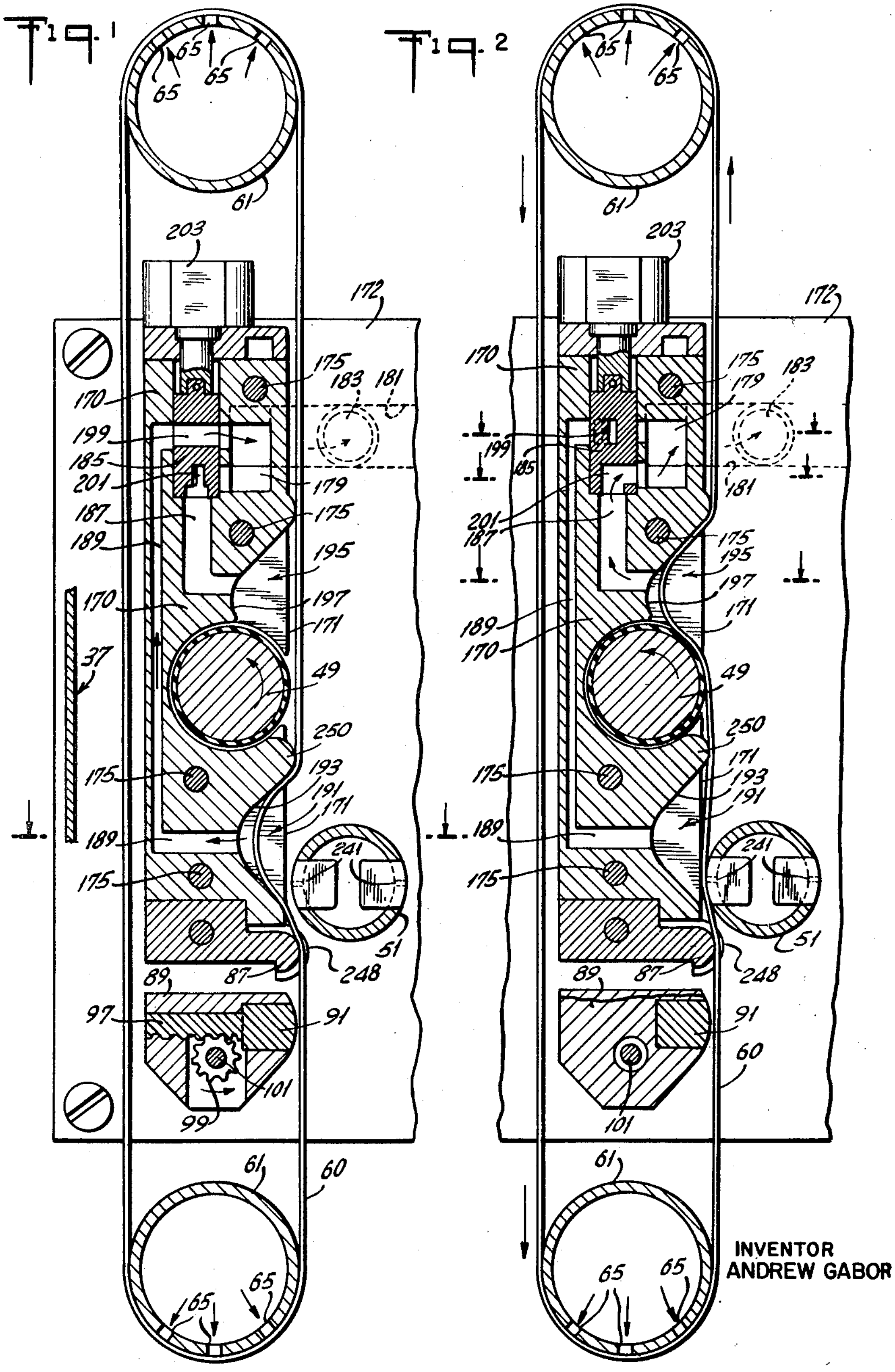
FIG. 1 is a side elevation with parts shown in section one embodiment of the invention showing a tape loop out of engagement with the capstan.
FIG. 2 is a view similar to FIG. 1 showing a tape loop in engagement with the capstan.

Referring now to FIG. 1, a so-called drive block 170 has a manifold chamber 179 which is connected to a suitable vacuum pump (not shown) that draws air from the manifold chamber 179 via a passageway 181. The vacuum pump connects to the passageway 181 via a hose 183. A valve mechanism 185 is provided in each drive block to connect the manifold chamber 179 selectively either to a passageway 187 defined in the drive block or to a passageway 189 defined in the drive block.

As illustrated in FIG. 1, the drive block is surrounded by a tape loop 60 which is drawn into a pocket 191 defined by a contoured depression 193 in the drive block and a pair of separating plates 171 extending up between the depressions 193. The pocket 191 is positioned opposite a transducing head carrier 51 and extends up above the head carrier. The passageway 189 communicates with the pocket 191 in the drive block so that air being drawn through the passageway 189 into the manifold chamber 179 will pull the tape loop into the pocket 191.

A second pocket 195 is formed above the capstan in each transducing unit. This pocket 195 is defined by a contoured depression 197 in the front of the drive block 170, the capstan itself, to which the depression extends, and a pair of separating plates 171 which extend up between the depressions 197 and around the capstan. The pocket 195 in front of each transducing unit communicates with the passageway 187 defined in the drive block of the transducing unit.

When it is desired to perform a transducing operation on the tape loop, the valve mechanism 185 in the transducing unit for a selected tape is turned to communicate the manifold chamber 179 with the passageway 187 in this transducing unit. As a result, air will be drawn in through the pocket 195 of this transducing unit and through the passageway 187 into the manifold chamber 179, and the flow of air into the pocket 191 and through the passageway 189 will be cut off.

As a result, the tape loop will be drawn into the pocket 195 and will be released from the pocket 191. Accordingly, the tape will assume the position shown in FIG. 2.

Upon being drawn into the pocket 195, the tape loop is brought into contact with the capstan and, upon being released from the pocket 191, is brought adjacent the head carrier as shown in FIG. 2. As a result, the tape will be driven by the capstan.

In the illustration of FIG. 2, the capstan rotates counter-clockwise, thus driving the tape in a counter-clockwise direction. The sectional view in FIG. 2 shows the tape loop 60 drawn into the pocket 195 for such rotation.

As shown in FIG. 2, the head carrier is positioned so that the tape wraps slightly around it when it is released from the pocket 191, but an air bearing is generated between the tape and the head carrier, so that the tape does not actually come into contact with the head carrier. In this manner, the magnetic tape is brought into transducing relationship with the magnetic recording head in the head carrier and is driven past these magnetic heads for a transducing operation.

The valve mechanism 185, as shown in FIGS. 1 and 2, comprises a cylindrical body, through which passageway 199 and 201 are formed. The cylindrical body is turnable in a bore defined in the drive block 170 between two positions by means of a rotary solenoid 203 which is mounted on top of the drive block.

In one position of the valve mechanism, the passageway 199 connects the manifold chamber 179 to the passageway 189, and in the other position, the passageway 201 connects the manifold chamber 179 to the passageway 187. Thus, the rotary solenoid 203, by rotating the valve mechanism 185 between its two positions, can connect the manifold chamber 179 selectively to either the passageway 187 or 189, and a magnetic tape loop can be selected for a transducing operation by energizing the proper rotary solenoid 203 to turn the corresponding valve mechanism 185, to communicate the manifold chamber 179 with the passageway 187 in the corresponding transducing unit.

It will be understood that certain features and subcombinations are of utility and may be employed without reference to other features and subcombinations. This is contemplated by and is within the scope of the claims. It is further obvious that various changes may be made in details within the scope of the claims without departing from the spirit of the invention. It is, therefore, to be understood that this invention is not to be limited to the specific details shown and described.

What is claimed is:

1. A random access information memory device comprising:

a storage tape, a driving block defining a first pocket and a second pocket adjacent said tape, control means having first and second conditions, operable in said first condition to draw said tape into said first pocket and release said tape from said second pocket, and operable in said second condition to release said tape from said first pocket and to draw said tape into said second pocket, a capstan positioned to engage said tape only when said control means is in said first condition, and a transducing head positioned to perform transducing operations on said tape only when said control means is in said first condition.

2. A random access information memory device as in claim 1 wherein said control means includes means for selectively forming a vacuum in said first pocket and said second pocket.

3. A random access information memory device as in claim 2 wherein said transducing head is positioned opposite said second pocket whereby said tape is brought into transducing relationship with said transducing head when said tape is released from said second pocket.

References Cited

UNITED STATES PATENTS

| | | | |
|---|---|---|---|
| 3,184,131 | 5/1965 | Fieldgate | 226—95 |
| 3,442,419 | 5/1969 | Badum et al. | 226—95 |

TERRELL W. FEARS, Primary Examiner

V. P. CANNEY, Assistant Examiner

U.S. Cl. X.R.

226—95, 113